(12) United States Patent
Potter

(10) Patent No.: US 11,319,927 B2
(45) Date of Patent: May 3, 2022

(54) VANE PITCH CONTROL OF A WIND TURBINE ASSEMBLY

(71) Applicant: Noel Richard Potter, Bountiful, UT (US)

(72) Inventor: Noel Richard Potter, Bountiful, UT (US)

( * ) Notice: Subject to any disclaimer, the term of this patent is extended or adjusted under 35 U.S.C. 154(b) by 172 days.

(21) Appl. No.: 16/824,150

(22) Filed: Mar. 19, 2020

(65) Prior Publication Data

US 2020/0217301 A1 Jul. 9, 2020

Related U.S. Application Data

(63) Continuation-in-part of application No. 15/810,512, filed on Nov. 13, 2017, now Pat. No. 10,655,603.

(51) Int. Cl.
*F03D 7/06* (2006.01)
*F03D 3/06* (2006.01)

(52) U.S. Cl.
CPC ............... *F03D 7/06* (2013.01); *F03D 3/067* (2013.01); *Y02E 10/74* (2013.01)

(58) Field of Classification Search
CPC ............ F03D 7/06; F03D 3/067; Y02E 10/74
See application file for complete search history.

(56) References Cited

U.S. PATENT DOCUMENTS

| 11,161,208 B2* | 11/2021 | Upton | B29C 70/083 |
| 2004/0042899 A1* | 3/2004 | Khan | F03D 3/005 416/51 |
| 2013/0285382 A1* | 10/2013 | Grigg | F03D 9/25 290/54 |

FOREIGN PATENT DOCUMENTS

CN 101634277 A * 1/2010

* cited by examiner

*Primary Examiner* — Michael C Zarroli
(74) *Attorney, Agent, or Firm* — Noel R. Potter

(57) ABSTRACT

Methods and apparatuses for wind turbine vane pitch control including a turbine shaft that transmits mechanical power, a vane support structure that is coupled to the turbine shaft, a vane that is coupled to the vane support structure through a vane shaft, a balancing weight that is coupled to a first location of the vane, and an alignment weight that is coupled to a second location of the vane.

19 Claims, 6 Drawing Sheets

VANE PITCH CONTROL OF A WIND TURBINE ASSEMBLY

CROSS REFERENCE

The present Application for Patent is a Continuation-In-Part of allowed U.S. patent application Ser. No. 15/810,512 by Noel R. Potter, entitled "VANE PITCH CONTROL OF A WIND TURBINE ASSEMBLY," filed Nov. 13, 2017 issued as U.S. Pat. No. 10,655,603, assigned to the assignee hereof, and expressly incorporated herein.

BACKGROUND

The present disclosure relates generally to generating electricity from the wind. A wind turbine may be configured to spin according to wind incident to the wind turbine. A wind turbine may be configured to spin on a horizontal axis or a vertical axis. Thus, a wind turbine may be configured to convert kinetic energy from the wind into electrical power. Such wind turbines, however, may become unstable due to system imbalances.

SUMMARY

According to at least one example, a wind turbine pitch control apparatus of a wind turbine assembly is described. In one example, a turbine shaft transmits mechanical power, a vane support structure is connected to the turbine shaft, a vane is connected to the vane support structure through a vane shaft, a balancing weight is connected to or attached to or placed in a first location of the vane, and an alignment weight is connected to or attached to or placed in a second location of the vane.

In one example, the vane is in the shape of an airfoil. In some examples, the vane is an airfoil connected to or attached to the vane shaft at the quarter chord point. It is noted that vane or airfoil may be used interchangeably to indicate a vane in the shape of an airfoil.

In one example, the balancing weight is placed at the first location on the vane to balance the vane about the vane shaft. In some examples, the balancing weight at the first location eliminates a pitch variation caused by a centrifugal force acting on the vane. In one example, the balancing weight is located within a leading edge of the vane. In some examples, the balancing weight includes at least one of a metal and a polymer.

In one example, the alignment weight is placed at the second location on the vane to align a direction of a leading edge of the vane to be perpendicular to a center of the turbine shaft while the wind turbine is rotating. In some examples, the alignment weight at the second location maintains the vane's angle of attack below a stall angle for at least a portion of the rotation of the wind turbine. At least a portion of the alignment weight may be perpendicular to the chord of the vane at the quarter chord point. In some examples, the alignment weight is located within an outer surface of the vane. In one example, the alignment weight includes at least one of a metal and a polymer.

In one example, the vane shaft is connected to at least one of a plurality of support arms of the vane support structure. The vane shaft may allow the vane to rotate freely about the vane shaft. In some examples, a vane rotational stop attaches to at least one of the plurality of vane support arms of the vane support structure. The vane rotational stop may limit rotation of the vane about the vane shaft.

A method for wind turbine vane pitch control is also described. In one example the method includes transmitting, via a turbine shaft, mechanical power, attaching, via a vane shaft, a vane to a vane support structure to allow the vane to rotate about the vane shaft, placing a balancing weight at a first location of the vane, and placing an alignment weight at a second location of the vane.

Features from any of the above-mentioned examples may be used in combination with one another in accordance with the general principles described herein. These and other examples, features, and advantages will be more fully understood upon reading the following detailed description in conjunction with the accompanying drawings and claims.

BRIEF DESCRIPTION OF THE DRAWINGS

The accompanying drawings illustrate a number of exemplary examples and are a part of the specification. Together with the following description, these drawings demonstrate and explain various principles of the instant disclosure.

Figure 1:
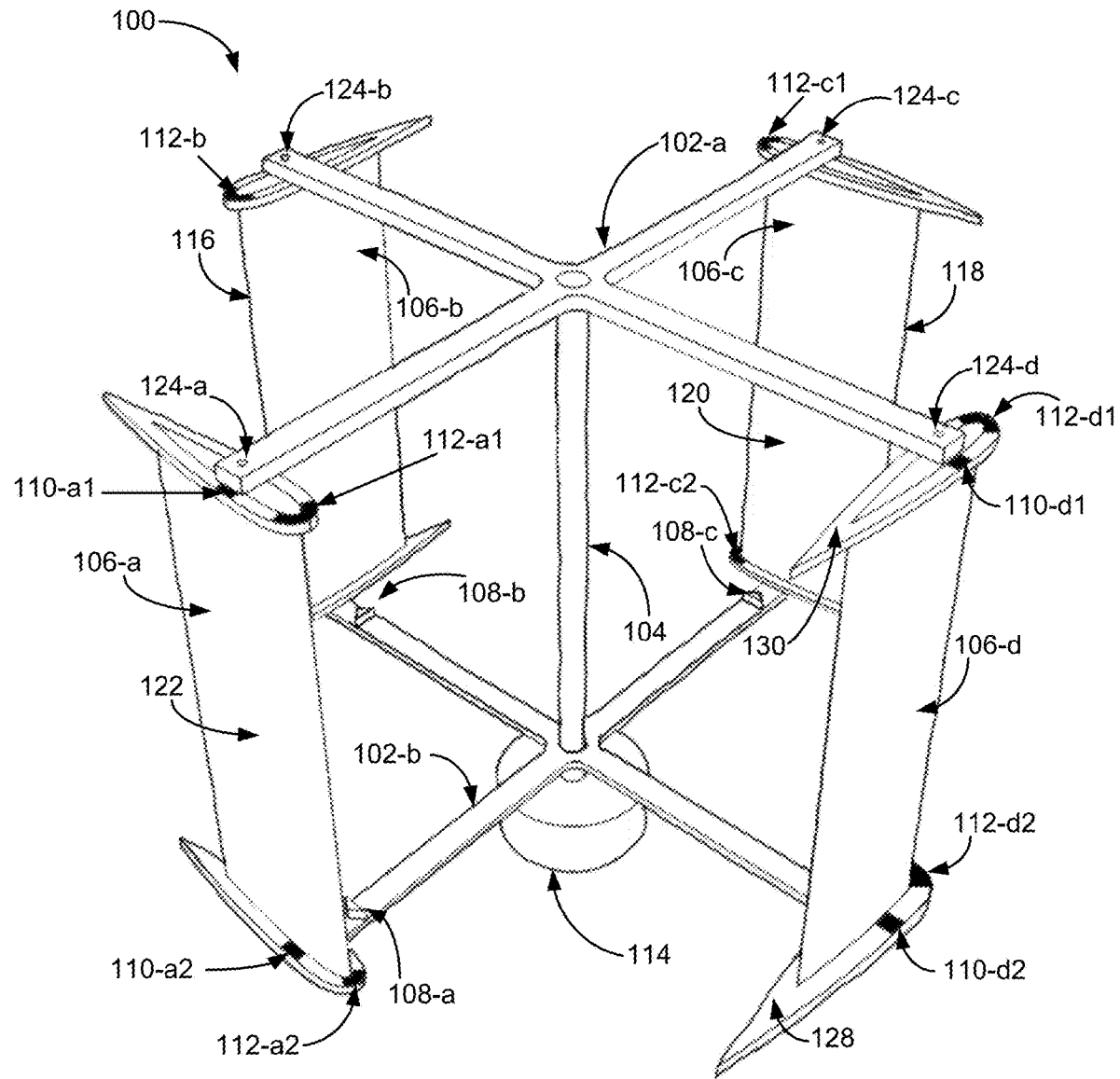
FIG. 1 depicts an exemplary schematic diagram of a wind turbine assembly in which the present apparatuses and methods may be implemented.

While the examples described herein are susceptible to various modifications and alternative forms, specific examples have been shown by way of example in the drawings and will be described in detail herein. However, the exemplary examples described herein are not intended to be limited to the particular forms disclosed. Rather, the instant disclosure covers all modifications, equivalents, and alternatives falling within the scope of the appended claims.

DETAILED DESCRIPTION

The apparatuses and methods described herein relate to configuring vane assemblies with weights to control the pitch of the vane so that the vanes can produce torque and power even at relatively low wind speeds.

A wind turbine assembly may include a turbine shaft configured to transmit mechanical power generated by the wind turbine assembly into electrical power. A support structure may connect to one or more vane shafts. Each vane shaft may include one or more vanes. Each vane may be configured to spin freely on a vane shaft to the limits of a stop. Wind incident on a vane may cause the vane shaft to exert a force on the support structure, which force may be transferred to the turbine shaft, causing the turbine shaft to spin. The mechanical power of the turbine shaft spinning may be converted into electrical power via a generator/alternator assembly that is part of the wind turbine assembly.

A wind turbine that utilizes fixed pitch vanes must be rotationally accelerated to a revolutions per minute (RPM)

where they may produce mechanical power because they produce only very negligible amounts of torque at low RPMs. As a result, benefits may be realized by an apparatus that may dynamically change the pitch of the vane so that the wind turbine may produce positive torque and power even at low RPMs.

In one example, one or more weights may be used to control airfoil pitch. In some examples, one or more balancing weights may be used to balance the airfoils to keep the tail end of the airfoil from altering the pitch due to centrifugal force. Additionally, or alternatively, one or more alignment weights may keep the chord of the airfoil at the quarter chord point perpendicular to the center of the wind turbine when the angle of attack is less than stall angle. The pitching moment may be relied upon to position the airfoil pitch when the angle of attack is above the stall angle.

In some examples, one or more weights may be used to balance an airfoil. When the airfoil shaft is placed at the quarter chord point, the tail end of the airfoil from the airfoil shaft to the back tip is heavier than the front of the airfoil from the airfoil shaft to the leading edge. The quarter chord point may be referred to as the aerodynamic center. The aerodynamic center is the point at which the pitching moment coefficient for the airfoil does not vary with lift coefficient. The quarter chord point, or assumed aerodynamic center, may be taken about which the forces and moment are generated. At the quarter chord point, or 25% chord position, the moment generated may be found and proven to be nearly constant with varying angle of attack.

In some examples, a balancing weight may be placed at a point in line with the chord in the front of the leading edge of the airfoil, or vane cap, or both, to balance the airfoil about its shaft. Centrifugal forces are generated on the airfoils as the wind turbine rotates causing the tail end of the airfoil to swing out away from the center of rotation, which may cause an undesirable change in the pitch of the airfoil. The balancing weight, however, may prevent the tail end of an airfoil from swinging out away from the center of rotation due to centrifugal forces. Thus, the balancing weight may improve the angle of attack by preventing the rotation of the vane about the vane shaft due to centrifugal forces.

In one example, placing an alignment weight a distance away from the center of the airfoil shaft on the side of the airfoil away from the center of wind turbine rotation produces an alignment torque created by centrifugal force acting on the alignment weight. This aligns the airfoil perpendicular to the center of the wind turbine when the wind turbine is rotating and the angle of attack is below the stall angle.

In some examples, enabling the airfoil to freely rotate about an airfoil shaft combined with weights added to the airfoil in predetermined locations the pitch may be controlled to allow the wind turbine to self-start. Self-starting allows the wind turbine to charge an energy storage device with energy. The accumulated energy may be used to accelerate the wind turbine up to an operating speed for maximum efficiency. In some examples, the airfoil may include airfoil stops configured to prevent an airfoil from rotating all the way around the airfoil shaft. In some examples, the airfoil is enabled to freely rotate about the airfoil shaft within the limit of one or more airfoil stops.

When the angle of attack of a wind turbine airfoil is below the stall angle the pitching moment may be at or relatively near zero. The pitching moment increases in magnitude when the angle of attack reaches and/or exceeds the stall angle. When the angle of attack exceeds the stall angle, the pitching moment is a torque that acts to rotate the airfoil about the airfoil shaft in a direction that will reduce the angle of attack to relatively near the stall angle. Thus, when the angle of attack exceeds the stall angle, the pitching moment acts to increase the lift to drag ratio, which in turn increases the positive torque applied to the rotation of the wind turbine.

In some examples, adding weights to an airfoil reduces the amount of power to accelerate the wind turbine up to an operating rotational velocity. While the wind turbine is being accelerated to operating rotational velocity, if the airfoil speed multiple is below four times the speed of the wind, then there may be rotational positions where the angle of attack is greater than the stall angle and the torque is negative because the projected drag force is larger than the projected lift force. This is at least one reason why fixed pitch wind turbines do not produce power at low wind speed multiples. Because a variable pitch airfoil is allowed to rotate around its shaft, when the angle of attack is larger than the stall angle the pitching moment will rotate the airfoil about its shaft and reduce the angle of attack and thereby increase the positive torque. As a result, at lower wind speed multiples the variable pitch produces some power which lowers the need for external power to accelerate the wind turbine up to an operating rotational velocity.

FIG. 1 depicts an exemplary schematic diagram of a wind turbine assembly 100 in which the present apparatuses and methods may be implemented. As depicted, the wind turbine assembly 100 may include a turbine shaft 104 and vanes 106-*a* through 106-*d*. One or more vanes 106 may be configured in the shape of an airfoil. The vane support structure of wind turbine assembly 100 may include upper support 102-*a* and/or lower support 102-*b*. In some examples, upper support 102-*a* and/or lower support 102-*b* may be connected to the turbine shaft 104. In some examples, wind turbine assembly 100 may include vane shafts 124-*a* through 124-*d*. Vane shafts 124 may be configured to enable vanes 106 to rotate freely about vane shafts 124. As illustrated, each vane 106 may be connected to a vane shaft 124 at a quarter chord point. In some examples, each vane 106 may connect to upper support 102-*a* and/or lower support 102-*b* via vane shafts 124. In one example, vane shafts 124 may include a shaft that runs from the top of each vane 106 at the upper support 102-*a* to the bottom of each vane 106 at the lower support 102-*b*. In some examples, wind turbine assembly 100 may include one or more vane stops 108 (e.g., vane stops 108-*a* through 108-*c* as illustrated, vane stop 108-*d* being blocked by vane 106-*d*). Vane stops 108 may be attached to support structure 102-*a* and/or 102-*b* to prevent a complete rotation of the vanes 106 about the vane shaft. Preventing the complete rotation of vanes 106 may enable self-starting. Self-starting may include turbine shaft 104 rotating without any other external input other than the wind incident on vanes 106.

In one example, wind incident on vane 106 may be converted to mechanical power via turbine shaft 104. Wind turbine assembly 100 may include a motor 114. Motor 114 may include an electrical motor, a generator, an alternator, and the like. Thus, in some examples the mechanical power generated by spinning turbine shaft 104 may be converted to electrical power via motor 114.

In some examples, as illustrated the wind turbine assembly 100 may be configured to spin counter-clockwise. In some examples, the wind turbine assembly 100 may be configured to spin clockwise. As depicted, each vane 106 is an airfoil. Thus, each vane 106 includes a leading edge (e.g., the leading edge 116 of vane 106-*b* representative of the leading edge of each vane), a trailing edge (e.g., the trailing edge 118 of vane 106-c representative of the trailing edge of each vane), an inner surface (e.g., the inner surface 120 of vane 106-c representative of the inner surface of each vane), and an outer surface (e.g., the outer surface 122 of vane 106-a representative of the outer surface of each vane).

The leading edge 116 may include a rounded tip and the trailing edge 118 may include a sharp, pointed tip. The inner surface 120 and/or outer surface 122 may include a relatively flat surface. In one example, each inner surface and/or outer surface 122 may include a surface that runs from a leading edge to a trailing edge. As depicted, the inner surface 120 faces towards the turbine shaft 104, while the outer surface 122 faces away from the turbine shaft 104. In some examples, the inner surface 120 and/or outer surface 122 may include at least in part a flat surface according to existing airfoil shapes. Additionally, or alternatively, the inner surface 120 and/or outer surface 122 may include at least in part a curved surface according to existing airfoil shapes.

In some examples, wind turbine assembly 100 may include one or more alignment weights 110 per airfoil (e.g., alignment weights 110a through 110d), and/or one or more balancing weights 112 per airfoil (e.g., balance weights 112a through 112d). In some examples, the one or more alignment weights 110 and/or one or more balancing weights 112 may be placed on vanes 106.

In one example, alignment weight 110 may be configured to align vane 106 to be perpendicular to the center of the turbine shaft 104 when the turbine shaft 104 is rotating and the angle of attack of vane 106 is less than the stall angle of the vane 106. In some examples, alignment weight 110 may be placed at a location on vane 106 to align a direction of the leading edge of vane 106 to be perpendicular to a center of the turbine shaft 104 while the wind turbine is rotating. In some examples, the alignment weight 110 at this location maintains the vane's 106 angle of attack below a stall angle for at least a portion of the rotation of the wind turbine assembly 110. At least a portion of the alignment weight 110 is located adjacent to a quarter chord point of vane 106. In some examples, the alignment weight is located within an outer surface of the vane (e.g., outer surface 122). In some examples, alignment weights 110 may include a metal and/or a polymer.

In one example, balancing weight 112 may be placed at a location on vane 106 to balance vane 106 about vane shaft 124. Balancing weight 112 may be placed at this location to eliminate a pitch variation caused by centrifugal force acting on vane 106 and/or eliminate centrifugal forces changing the pitch of vane 106. In some examples, balancing weight 112 may be located within a leading edge of the vane (e.g., leading edge 116). In one example, balancing weight 112 may include a metal and/or a polymer.

In some examples, each vane 106 may include flared vane caps or end caps at the top and/or bottom of each vane 106. As illustrated, vanes 106 may include an upper end cap (e.g., upper end cap 130 of vane 106-d representative of the upper end cap of each vane 106) and/or a lower end cap (e.g., lower end cap 128 of vane 106-d representative of the lower end cap of each vane 106). The upper/lower end caps may be in a shape identical or at least similar to the shape of vane 106 (e.g., a tear-drop shape of an airfoil). The upper/lower end caps may be flared or enlarged from the cross-sectional shape of the rest of vane 106. In some examples, the one or more alignment weights 110 and/or one or more balancing weights 112 may be placed in an upper portion and/or lower portion of each vane 106. In some examples, the one or more alignment weights 110 and/or one or more balancing weights 112 may be placed in the upper and/or lower end caps of each vane 106. In some examples, the one or more alignment weights 110 and/or one or more balancing weights 112 may be placed in an upper portion and/or lower portion of each vane 106, and in the upper and/or lower end caps of each vane 106. The end caps may provide one or aerodynamic more benefits (e.g., reduce turbulence, reduce vortices, etc.). In some examples, the vanes 106 may not include end caps.

In one example, the end caps may prevent the reduction of lift caused by the movement of air from the high-pressure side of the airfoil to the low-pressure side at each end of the airfoil. Additionally or alternatively, in some examples the end caps may house the balancing and/or the alignment weights. In some examples, one or more dimensions of the end caps may be determined by one or more attributes of a material used to balance and/or align the airfoil. For example, a thickness, a width, a length, or a depth of an end cap, or any combination thereof, may be based at least in part on one or more attributes of a material used to balance and/or align the airfoil. For example, a certain weight at a certain location on the airfoil may be calculated to balance and/or align the airfoil. Accordingly, a volume or amount of the material needed to balance and/or align the airfoil may be calculated based at least in part on the density of the material. One or more dimensions of an end cap may then be based at least in part on the volume or amount of material calculated to balance and/or align the airfoil. For example, a cavity in the end cap may be configured to hold the material used to balance and/or align the airfoil. One or more dimensions of the cavity (e.g., width, length, depth, area, volume) may be determined by the amount, volume, and/or weight of material used to fill the cavity. One or more dimensions of the end cap may then be based on the determined one or more dimensions of the cavity that is filled with the material used to balance and/or align the airfoil.

Figure 2:
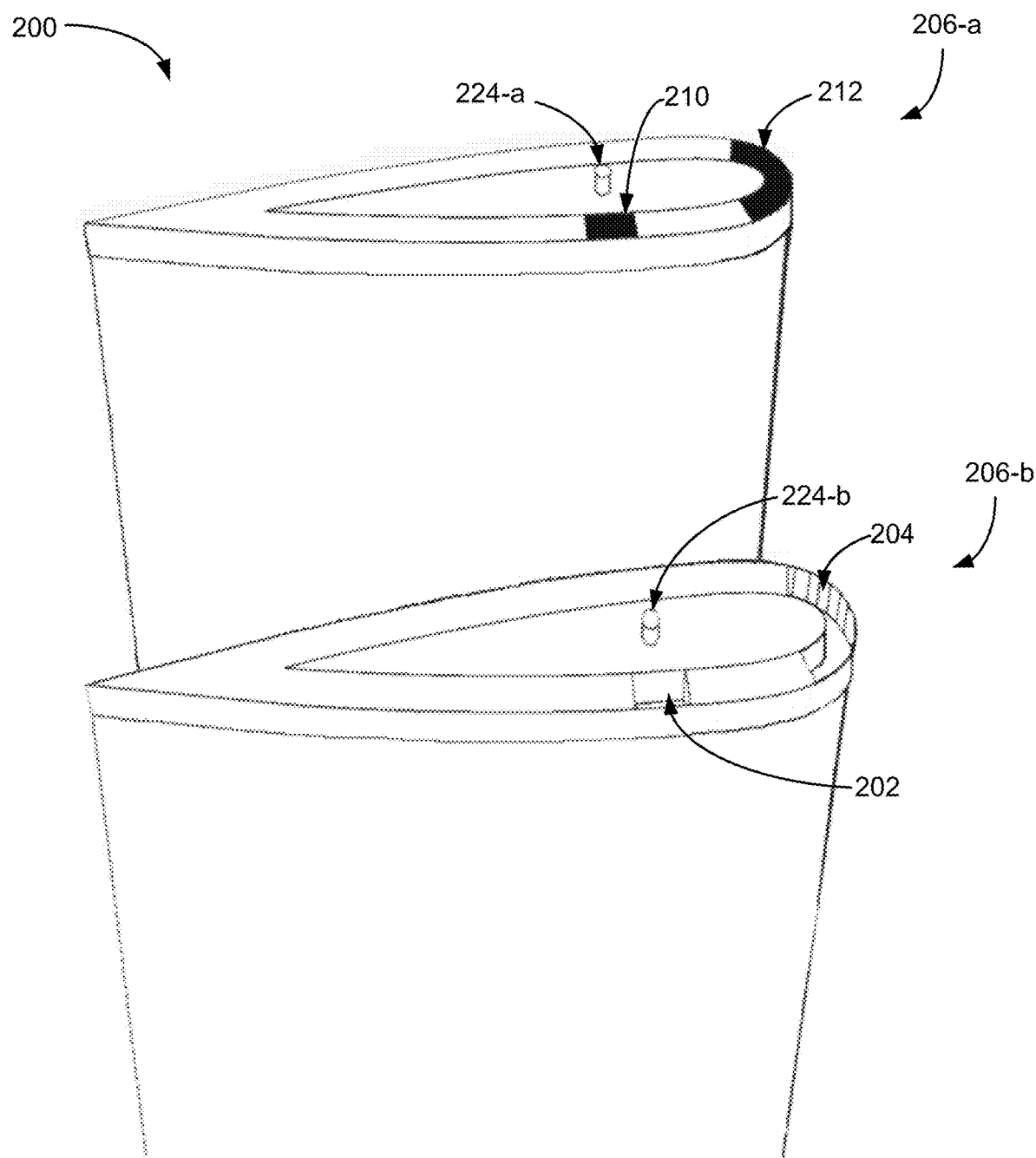
FIG. 2 depicts another exemplary schematic diagram of a wind turbine assembly in which the present apparatuses and methods may be implemented

FIG. 2 depicts another exemplary schematic diagram of a wind turbine assembly 200 in which the present apparatuses and methods may be implemented. The wind turbine assembly 200 may illustrate an example of a vane without an end cap. The wind turbine assembly 200 may be one example of the wind turbine assembly 100 depicted in FIG. 1. In some examples, the wind turbine assembly 200 includes vane 206-a and vane 206-b. Vanes 206 may be one example of vanes 106 of FIG. 1. Vane 206-a may include a vane shaft 224-a and vane 206-b may include a vane shaft 224-b. Vane shafts 224 may be one example of vane shafts 124 of FIG. 1.

Vane 206-a may include an alignment weight 210 and/or a balancing weight 212. Alignment weight 210 may be one example of an alignment weight 110 of FIG. 1. Balancing weight 212 may be one example of a balancing weight 112 of FIG. 1. As illustrated, alignment weight 210 may be located at a quarter chord point on vane 206-a. In one example, as illustrated alignment weight 210 may be located adjacent to vane shaft 224-a. In some examples, alignment weight 210 may be located on an outer surface of vane 206-a. In some examples, the alignment weight 210 may be placed on an outer surface vane 206-a within a predetermined distance from the vane shaft 224-a. The alignment weight 210 may be placed on an outer surface of vane 206-a within a predetermined distance of the quarter chord point of vane 206-a. In some examples, the alignment weight 210 may be placed at the quarter chord point on the outer surface of vane 206-a. In one example, the balancing weight 212 may be placed at a leading edge of vane 206-a as illustrated.

As illustrated, vane shaft 206-*b* may include an alignment cavity 202 and a balancing cavity 204. The alignment cavity 202 may be an open area in which the material of an alignment weight may be placed (e.g., a metal and/or polymer). The balancing cavity 204 may be an open area in which the material of a balancing weight may be placed (e.g., a metal and/or polymer). Thus, in some examples, alignment weight 210 fills up an alignment cavity of vane 206-*a*. Additionally, or alternatively, balancing weight 212 may fill up a balancing cavity of vane 206-*a*.

Figure 3:
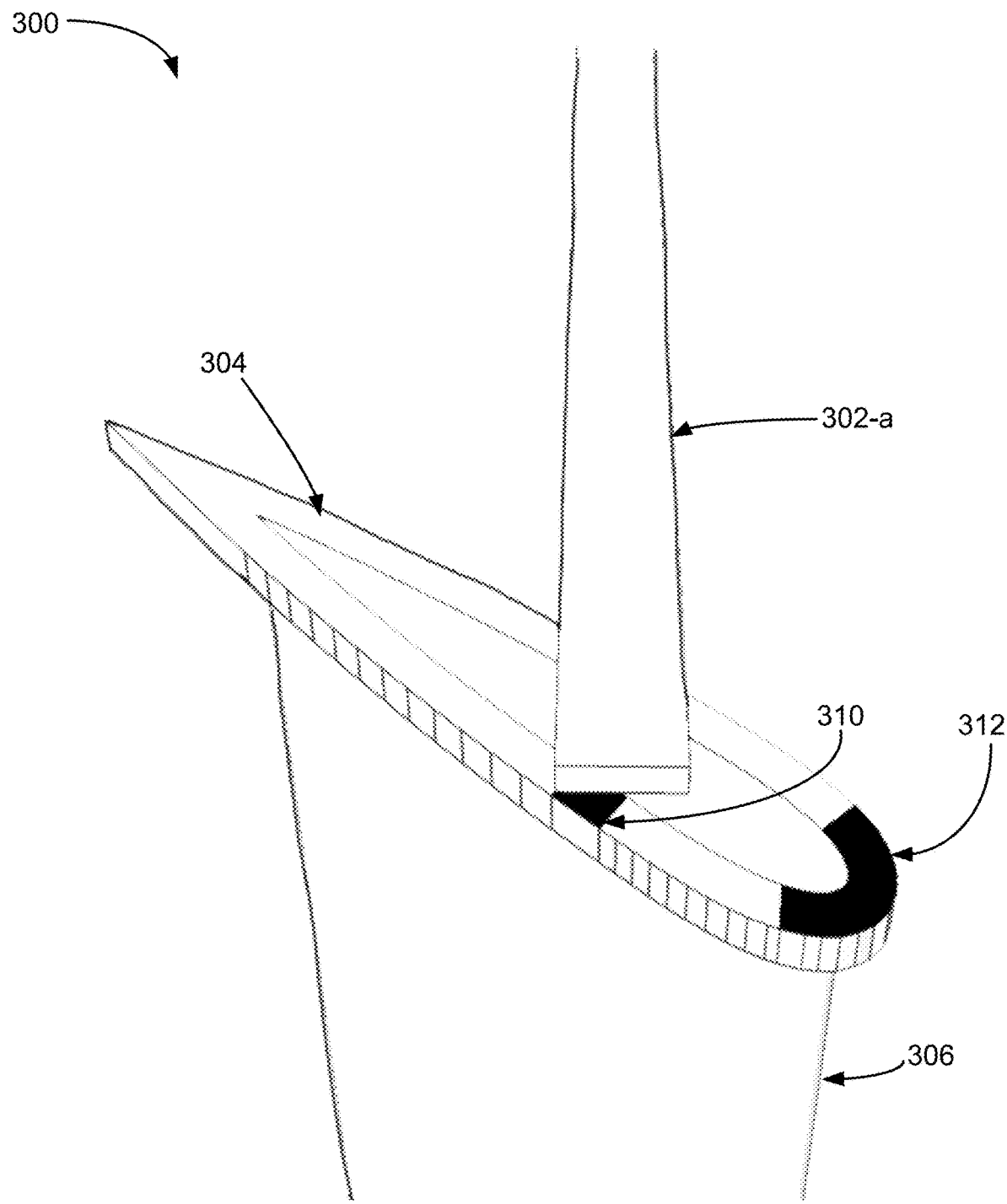
FIG. 3 depicts another exemplary schematic diagram of a wind turbine assembly in which the present apparatuses and methods may be implemented

FIG. 3 depicts another exemplary schematic diagram of a wind turbine assembly 300 in which the present apparatuses and methods may be implemented. The wind turbine assembly 300 may illustrate an example of a vane with an end cap. The wind turbine assembly 300 may be one example of the wind turbine assemblies 100/200 depicted in FIGS. 1 and/or 2. In some examples, the wind turbine assembly 300 may include an end cap 304, a vane 306 and an upper support 302-*a*. End cap 304 may be one example of end cap of FIG. 1 (e.g., lower end cap 128 or upper end cap 130). Vane 306 may be one example of vanes 106/206 of FIGS. 1 and/or 2. Upper support 302-*a* may be one example of upper support 102-*a* of FIG. 1.

As depicted, end cap 304 may include alignment weight 310 and balancing weight 312. Alignment weight 310 may be one example of an alignment weight of FIG. 1 or FIG. 2. Balancing weight 312 may be one example of a balancing weight of FIG. 1 or FIG. 2. Although wind turbine assembly 300 is depicted as including weights in end cap 304, it is understood that vane 306 may include an alignment weight in addition to alignment weight 310 or a balancing weight in addition to balancing weight 312, or both an alignment weight and a balancing weight in addition to alignment weight 310 and balancing weight 312.

In some examples, upper support 302-*a* may be connected to vane 306 via a vane shaft. Upper support 302-*a* may connect vane 306 to a turbine shaft of wind turbine assembly 300. FIG. 3 depicts vane 306 rotated clockwise about a vane shaft, indicating an angle of attack for vane 306. When the direction of leading edge of vane 306 is perpendicular to upper support 302-*a*, the angle of attack is zero degrees, assuming a wind speed of zero. If the leading edge of the airfoil is perpendicular to the upper support 302-*a* wind may cause the angle of attack to be greater than zero.

When vane 306 is rotated clockwise from 0 degrees angle of attack the angle of attack increases until stall. In some examples, vane 306 may be free to rotate about the vane shaft until vane 306 comes in contact with a vane stop (e.g., vane stops 108 of FIG. 1).

Figure 4:
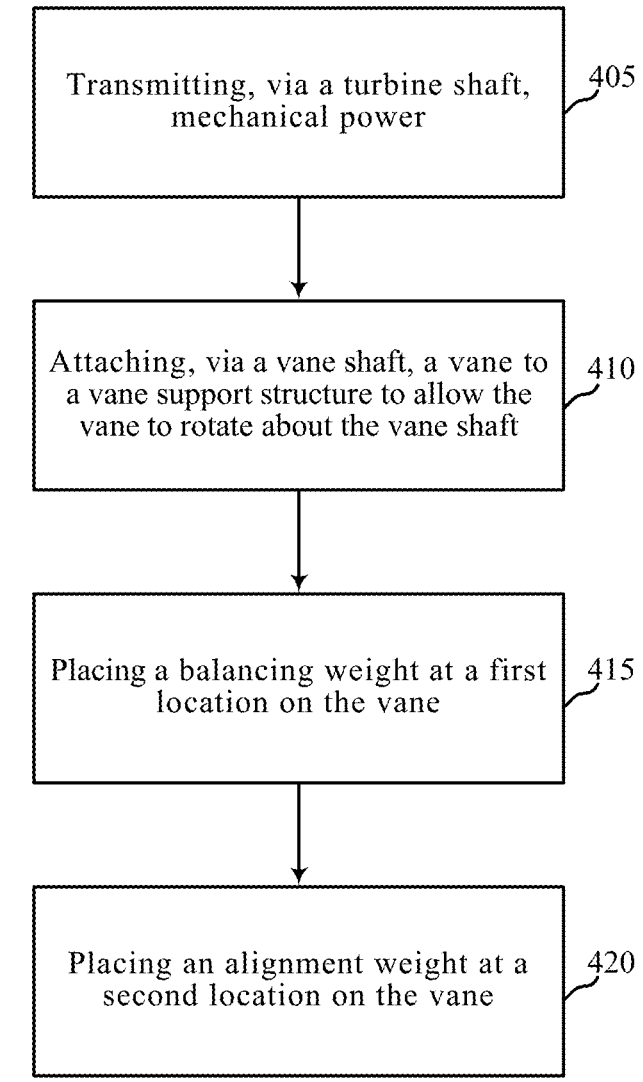
FIG. 4 is a flow chart illustrating an example of a method for wind turbine vane pitch control in a wind turbine assembly.

FIG. 4 is a flow chart illustrating an example of a method 400 for wind turbine vane pitch control of a wind turbine assembly.

At block 405, the method 400 may include transmitting, via a turbine shaft, mechanical power. At block 410, the method 400 may include attaching, via a vane shaft, a vane to a vane support structure to allow the vane to rotate about the vane shaft. At block 415, the method 400 may include placing a balancing weight at a first location on the vane. At block 420, the method 400 may include placing an alignment weight at a second location on the vane.

Figure 5:
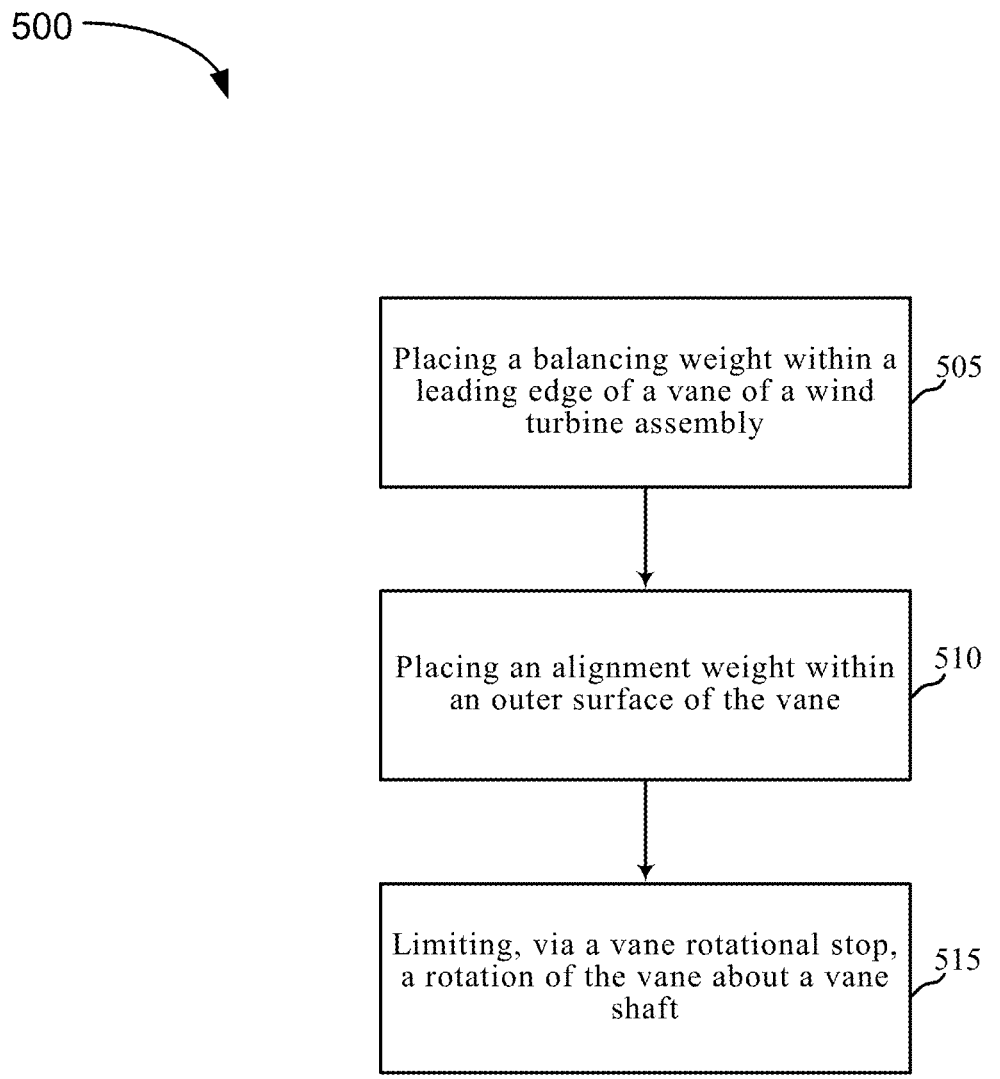
FIG. 5 is a flow chart illustrating an example of a method for wind turbine vane pitch control in a wind turbine assembly.

FIG. 5 is a flow chart illustrating an example of a method 500 for wind turbine vane pitch control of a wind turbine assembly.

At block 505, the method 500 may include placing a balancing weight within a leading edge of a vane of a wind turbine assembly. In one example, placing the balancing weight within the leading edge of the vane eliminates a pitch variation caused by a centrifugal force acting on the vane. The vane may be connected to a vane shaft at a quarter chord point. In some examples, the vane is in the shape of an airfoil.

At block 510, the method 500 may include placing an alignment weight within an outer surface of the vane. In some examples, placing the alignment weight within the outer surface of the vane aligns a direction of a leading edge of the vane to be perpendicular to a center of the turbine shaft while the wind turbine is rotating. In some examples, the alignment weight within the outer surface of the vane maintains the vane's angle of attack below a stall angle for at least a portion of the rotation of the wind turbine. At block 515, the method 500 may include limiting, via a vane rotational stop, a rotation of the vane about the vane shaft.

Figure 6:
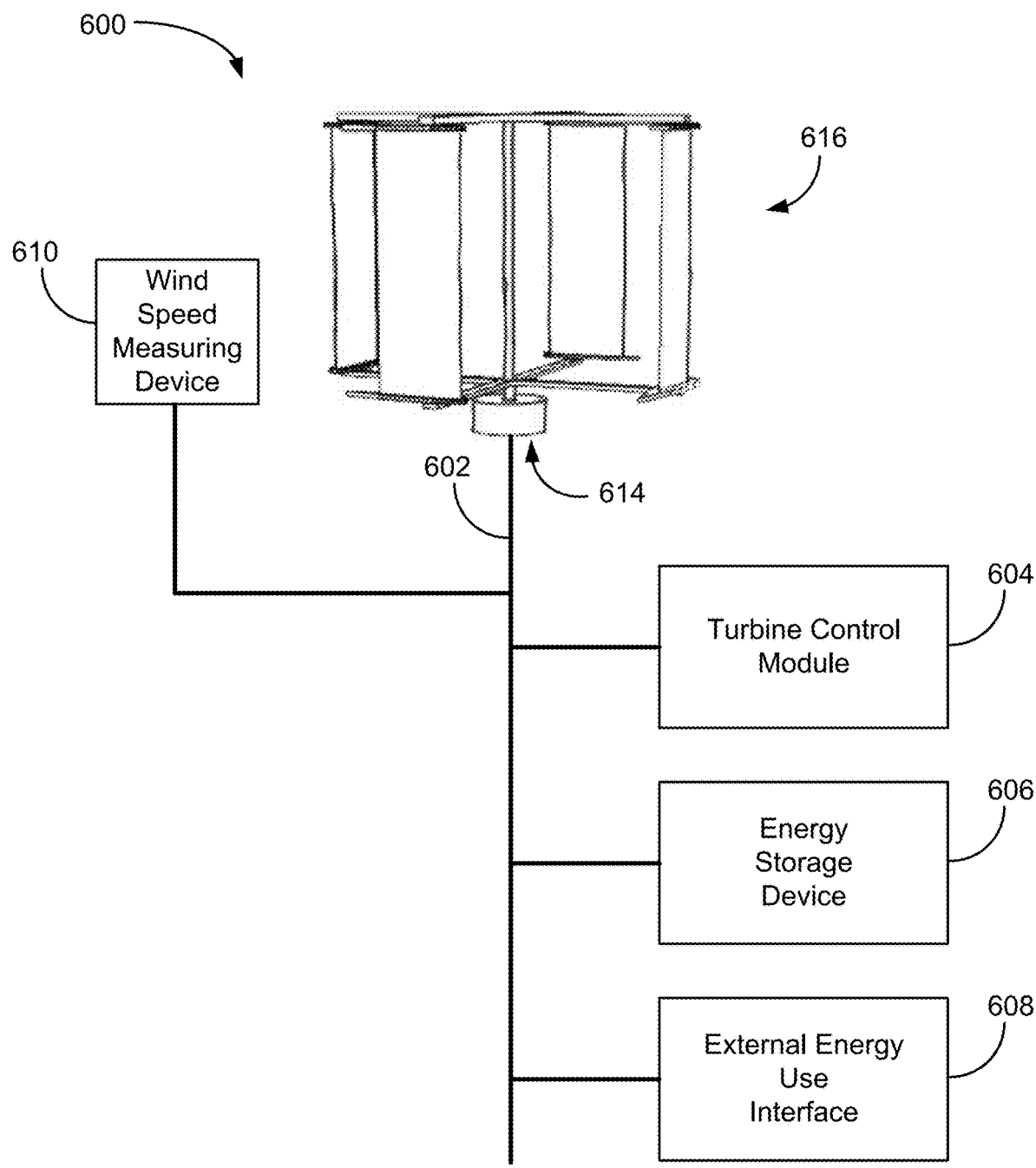
FIG. 6 depicts an exemplary schematic diagram of a wind turbine assembly in which the present apparatuses and methods may be implemented.

FIG. 6 depicts an exemplary schematic diagram of a wind turbine assembly 600 in which the present apparatuses and methods may be implemented. The wind turbine assembly 600 may include a bus 602, a turbine control module 604, an energy storage device 606, an external energy use interface 608, a wind speed-measuring device 610, motor 614, and wind turbine 616. Motor 614 may be one example of motor 114 of FIG. 1, either of which may be a motor or a generator or an alternator, or any combination thereof.

In some examples, bus 602 may include a communication bus by which data, commands, and/or signals may be communicated. Additionally, or alternatively, bus 602 may include a power bus by which power or electricity may be communicated. As depicted, bus 602 may connect to motor 614.

In one example, turbine control module 604 may control one or more aspects of wind turbine assembly 600. For example, turbine control module 604 may control and/or adjust a rotational speed of wind turbine assembly 600, such as increasing, decreasing, or stopping a rotation of wind turbine assembly 600.

In one example, energy storage device 606 may store energy generated by rotating wind turbine 616. Energy storage device 606 may include a battery. Mechanical energy generated by wind incident on wind turbine 616 may be converted to electrical energy via motor 614. The energy storage device 606 may include a rechargeable energy storage device. In some examples, energy storage device 606 may include at least one of a battery, a rechargeable battery, a fuel cell, a capacitor, a super capacitor, and the like.

In one example, external energy use interface 608 may be configured to provide power to an external device from energy stored in energy storage device 606 or from the motor 614. In some examples, external energy use interface 608 may adjust a voltage and/or amperage level in relation to the power provided to the external device.

In one example, the wind speed-measuring device 610 may include one or more components configured to measure the speed of the wind interacting with the wind turbine 616. The speed of the wind may be communicated over bus 602 from the wind speed-measuring device 610 to another component such as turbine control module 604 and/or external energy use interface 608. In one example, the speed of the wind interacting with the wind turbine 616 detected by wind speed-measuring device 610 may be used to adjust one or more aspects of wind turbine assembly 600. For example, the rotational speed of the wind turbine 616 may be increased or decreased (e.g., increased/decreased via turbine control module 604) based on the current speed of the wind interacting with wind turbine 616 detected by wind speed-measuring device 610.

While the foregoing disclosure sets forth various examples using specific block diagrams, flowcharts, and examples, each block diagram component, flowchart step, operation, and/or component described and/or illustrated herein may be implemented, individually and/or collectively, using a wide range of hardware, assembly, structural (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the present apparatuses and methods and their practical applications, to thereby enable others skilled in the art to best utilize the present apparatuses and methods and various examples with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed:

1. A wind turbine pitch control apparatus, the pitch control apparatus comprising:
    a turbine shaft to transmit mechanical power;
    a vane support structure coupled to the turbine shaft;
    a vane coupled to the vane support structure through a vane shaft;
    a balancing weight connected directly to a first location of the vane; and
    an alignment weight connected directly to a second location of the vane, wherein the alignment weight at the second location maintains an angle of attack of the vane below a stall angle for at least a portion of the rotation of the wind turbine.

2. The wind turbine pitch control apparatus of claim 1, wherein the vane is in the shape of an airfoil.

3. The wind turbine pitch control apparatus of claim 1, wherein the vane is an airfoil coupled to the vane shaft at a quarter chord point.

4. The wind turbine pitch control apparatus of claim 1, wherein the balancing weight is placed at the first location of the vane to balance the vane about the vane shaft, wherein the balancing weight at the first location eliminates a pitch variation caused by a centrifugal force acting on the vane.

5. The wind turbine pitch control apparatus of claim 1, wherein the balancing weight is located within a leading edge of the vane.

6. The wind turbine pitch control apparatus of claim 1, wherein the balancing weight comprises a metal or a polymer, or both.

7. The wind turbine pitch control apparatus of claim 1, wherein the alignment weight is placed at the second location of the vane to align a direction of a leading edge of the vane to be perpendicular to a center of the turbine shaft while the wind turbine is rotating.

8. The wind turbine pitch control apparatus of claim 1, wherein at least a portion of the alignment weight is located adjacent to a quarter chord point of the vane.

9. The wind turbine pitch control apparatus of claim 1, wherein the alignment weight is located within an outer surface of the vane.

10. The wind turbine pitch control apparatus of claim 1, wherein the alignment weight comprises a metal or a polymer, or both.

11. The wind turbine pitch control apparatus of claim 1, wherein the vane shaft is coupled to at least one of a plurality of support arms of the vane support structure, the vane shaft allowing the vane to rotate freely about the vane shaft.

12. The wind turbine pitch control apparatus of claim 11, comprising:
    a vane rotational stop attached to at least one of the plurality of vane support arms of the vane support structure, the vane rotational stop to limit rotation of the vane about the vane shaft.

13. A method for wind turbine vane pitch control, the method comprising:
    attaching, via a vane shaft of a wind turbine, a vane to a vane support structure, the vane shaft allowing the vane to rotate about the vane shaft;
    placing a balancing weight at a first location of the vane;
    placing an alignment weight at a second location of the vane to align a direction of a leading edge of the vane while the wind turbine is rotating; and
    transmitting, via a turbine shaft in a center of the wind turbine and connected to the vane shaft, mechanical power to a motor based on a wind incident upon the wind turbine, wherein the alignment weight at the second location maintains an angle of attack of the vane below a stall angle for at least a portion of the rotation of the wind turbine.

14. The method for wind turbine vane pitch control of claim 13, the method comprising:
    connecting the vane to the vane shaft at a quarter chord point, wherein the vane is in the shape of an airfoil.

15. The method for wind turbine vane pitch control of claim 13, the method comprising:
    placing the balancing weight at the first location on the vane to balance the vane about the vane shaft, wherein the balancing weight at the first location eliminates a pitch variation caused by a centrifugal force acting on the vane.

16. The method for wind turbine vane pitch control of claim 13, wherein the balancing weight is located within a leading edge of the vane, and wherein the balancing weight comprises a metal or a polymer, or both.

17. The method for wind turbine vane pitch control of claim 13, wherein the alignment weight is located within an outer surface of the vane, and wherein the alignment weight comprises a metal or a polymer, or both.

18. The method for wind turbine vane pitch control of claim 13, wherein the vane shaft is coupled to at least one of a plurality of support arms of the vane support structure, the vane shaft allowing the vane to rotate freely about the vane shaft.

19. The method for wind turbine vane pitch control of claim 18, comprising:
limiting, via a vane rotational stop, a rotation of the vane about the vane shaft, the vane rotational stop being attached to at least one of the plurality of support arms of the vane support structure.

* * * * *